Figure 3:
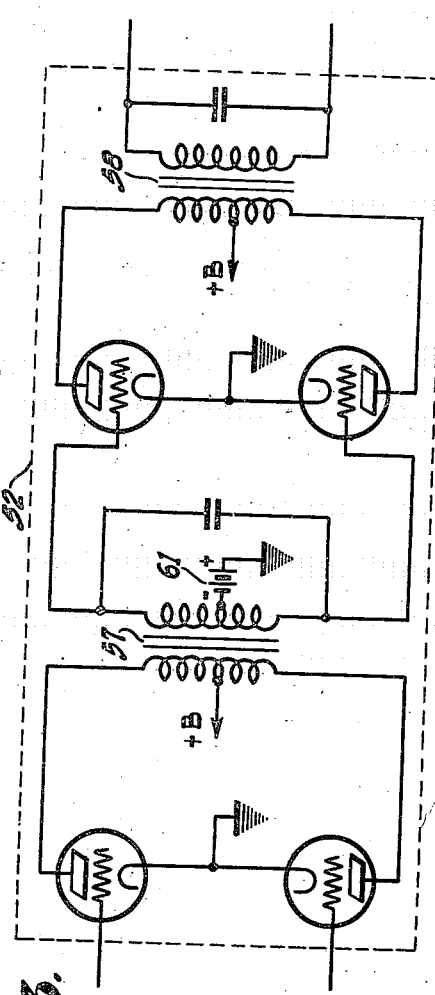

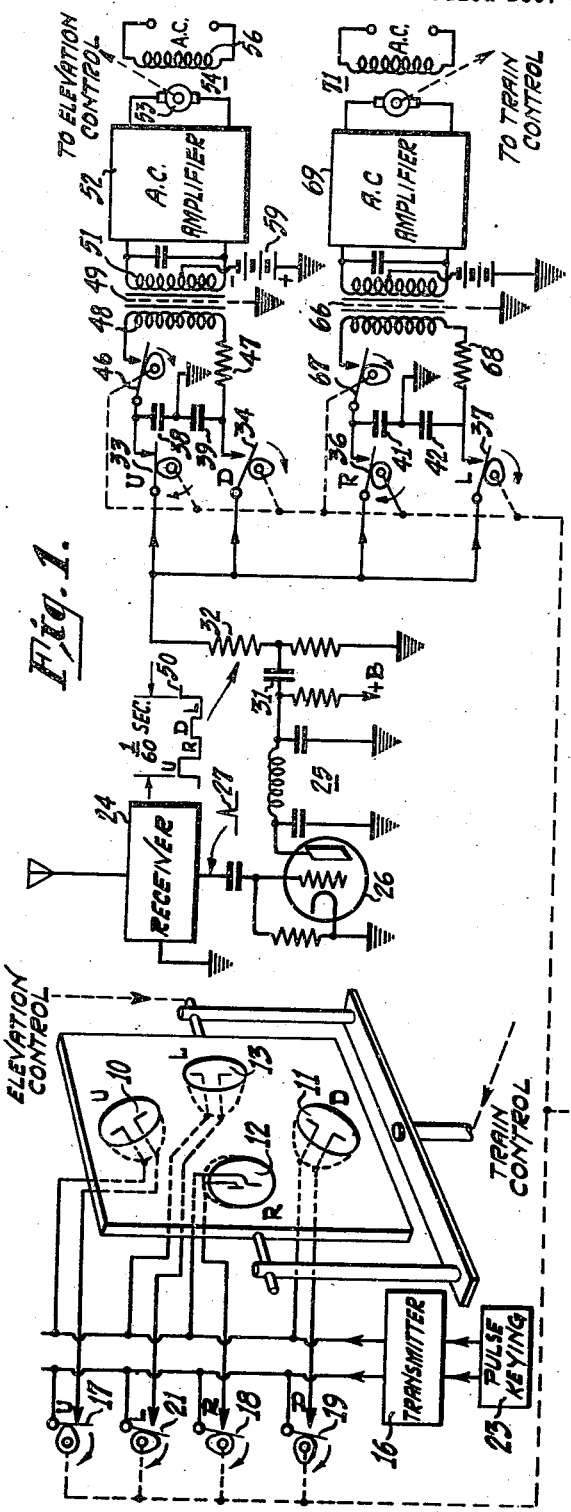

Patented June 3, 1947

2,421,663

UNITED STATES PATENT OFFICE 2,421,663

CONTROL OF SERVO MECHANISM

William A. Tolson, Princeton, N. J., assignor to Radio Corporation of America, a corporation of Delaware Application December 30, 1942, Serial No. 470,692

6 Claims. (Cl. 250—1.54)

My invention relates to pulse-echo systems and particularly to systems wherein an antenna system and/or guns or the like are moved automatically to a position determined by the location of an object relative to the radiation pattern of the antenna system. The invention is an improvement on the system described in application Serial No. 437,143, filed April 1, 1942, in the name of Alda V. Bedford and entitled Pulse echo control system, and will be described specifically as applied to a radio pulse-echo system wherein the transmitter radiates signals from antennas having overlapping directional radiation patterns.

An object of the invention is to provide an improved servo system for pulse-echo systems.

A further object of the invention is to provide an improved system for directing an antenna at an object automatically in accordance with the object's location relative to overlapping radiation patterns.

A further object of the invention is to provide an improved system for producing control signals in accordance with the location of an object with respect to overlapping radiation patterns.

A still further object of the invention is to provide an improved method of and means for reducing the effect on the servo control system of fluctuations in the amplitude of the received signals.

In my improved system, just as in the system of the above-mentioned Bedford application, the invention may be applied to a pulse-echo system having a directive antenna system so designed that its radiation pattern or patterns may be turned in both a horizontal plane and a vertical plane to search for an object such as an airplane. The antenna system may consist of four directive antennas which may be keyed successively, as described, for example, in application Serial No. 259,057, filed February 28, 1939, in the name of Irving Wolff, now issued as Patent No. 2,412,702, on Dec. 17, 1946, and entitled Object detection and location, or an antenna system may be employed which is keyed by means of shorting condensers as described and claimed in application Serial No. 412,943, filed September 30, 1941, in the name of George H. Brown, now issued as Patent No. 2,400,736, on May 21, 1946, and entitled Antenna systems.

In the receiver of my system, also just as in the above-mentioned Bedford application, the control signals are derived from the received pulses that have been reflected from the target or other object. They may be obtained from a peak voltage measuring circuit that is switched in synchronism with the keying of the directive antennas. Thus, the train or azimuth control signals and the elevation control signals are determined, respectively, by the relative amplitudes of the reflected pulses in the two horizontal radiation patterns and by the relative amplitudes of the reflected pulses in the two vertical radiation patterns. The switching circuit applies the "up," "down," "right" and "left" pulses to four capacitors, respectively, whereby the pulses are stored in their respective capacitors to produce voltages thereacross which are proportional to the amplitudes of the applied pulses. These capacitor voltages are utilized to control an amplifier which supplies driving power to a servo motor.

In accordance with the present invention the capacitor voltages are not applied directly to the control grids of the vacuum tubes supplying power to the motor as in the above-mentioned Bedford system but, instead, pairs of capacitors are discharged periodically and in differential or opposing relation to each other through a transformer primary circuit having comparatively low impedance. The transformer secondary applies the resulting induced voltage to the input circuit of an amplifier, preferably in push-pull relation. The said differential discharge of the two capacitors for the elevation control circuit may be produced by closing a switch during the transmission and reception of either the "right" pulses or the "left" pulses. Similarly, in the right-left or train control circuit the two capacitors which are charged by "right" and "left" pulses, respectively may be discharged differentially through the primary of a transformer during the transmission and reception of either the "up" pulses or the "down" pulses.

It was found in operating the above-mentioned Bedford system that fluctuations in the amplitude of the received signal changed the bias on the vacuum tubes of the balanced circuit supplying power to the motor since the D.-C. component of the capacitor voltages was impressed upon the tube grids. Such bias variations unbalanced the circuit due to the fact that it could be balanced perfectly only at one bias setting. This was particularly true when the motor-driving circuit was of the balanced modulator type.

By employing the above-described switching procedure for differentially discharging the capacitors, the motor-driving circuit is made substantially independent of fluctuations in the amplitude of the received signal, assuming that the fluctuations are not occurring so rapidly that the received signal strength changes appreciably during the reception of the "up" pulses and of the next succeeding "down" pulses, for example. Such independence of amplitude fluctuations results from the fact that the charges on a pair of capacitors go up proportional amounts with amplitude changes and from the fact that these capacitors are discharged through a low impedance circuit which brings the two capacitors to the same voltage at the end of the discharge.

Figure 4:
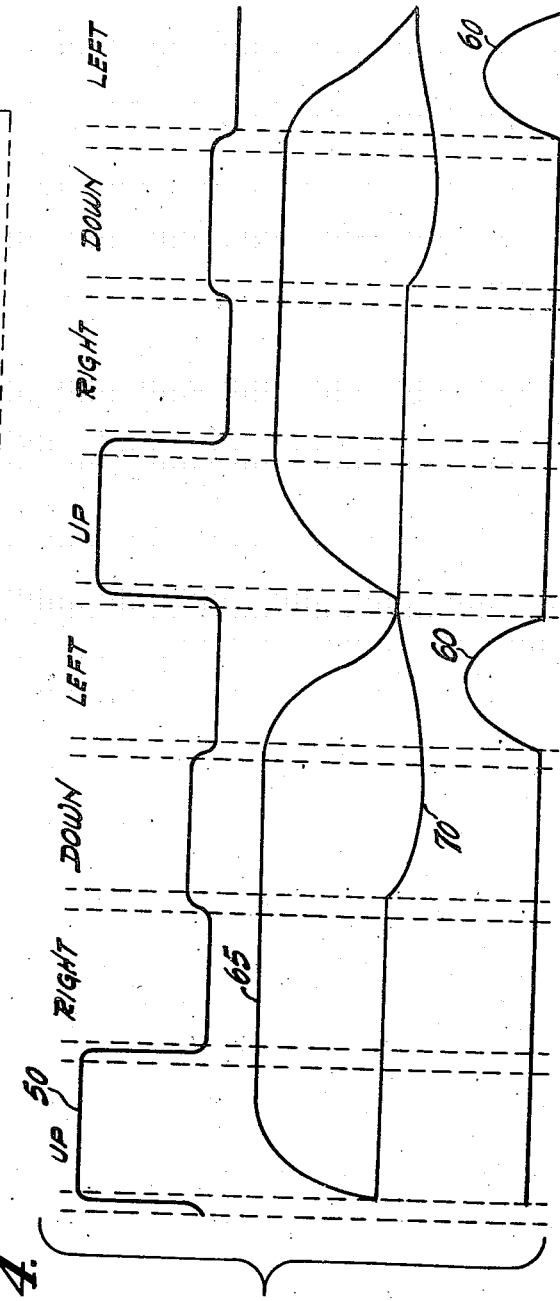

The invention will be better understood from the following description taken in connection with the accompanying drawing in which Figure 1 is a circuit diagram of one of the preferred embodiments of my invention; Figure 2 is a diagram of the radiation patterns of the directive antennas employed in the system of Fig. 1; Figure 3 is a circuit diagram of an amplifier that may be employed in the system of Fig. 1; and Figure 4 is a group of graphs that are referred to in explaining the operation of the invention. In the several figures, similar parts are indicated by similar reference characters.

Fig. 1 shows a radio pulse-echo system comprising four directive antennas 10, 11, 12 and 13 for radiating the pulse energy slightly upward, downward, to the right and to the left, respectively, with respect to a central common axis as indicated by the letters U, D, R and L. To simplify the drawing, these antennas are shown as dipoles having parabolic reflectors which are preferably located in a common vertical plane. The radiation patterns for these antennas are overlapping conical patterns of the character indicated in Fig. 2 where the patterns marked U, R, D and L correspond to the antennas similarly marked in Fig. 1. It is understood that the antenna radiation is greatest in the centers and weakens toward the edges of the cones. The antennas 10, 11, 12 and 13 may be like those illustrated in the above-mentioned Wolff or Brown applications, or of any suitable type. In the particular system being described they are mounted on a gimbal so that they may be moved to make their radiation patterns scan both horizontally and vertically.

It should be understood that the receiving antenna may be directive and the transmitting antenna non-directive if preferred; or the same antenna array may be used for both transmission and reception. Another satisfactory arrangement is the use of a rotating directive transmitting antenna and a receiving antenna, either directive or non-directive, that is switched synchronously therewith.

High frequency radio pulses are supplied successively to the U, R, D and L antennas from a transmitter 16 through cam operated switches 17, 18, 19 and 21, respectively, driven by a motor 22. The pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected signal (modulated by 4.1 kc. pulses in the example assumed) energy to supply pulses 27 to a detector or rectifier 26 which preferably is of the peak rectifying type. In the circuit illustrated, the rectifier 26 is a grid-leak biased peak rectifier tube which is well known in the television art. The output of rectifier 26 is passed through a low pass filter 25 and supplied through a large capacity blocking capacitor 31 and a resistor 32 and through cam operated switches 33, 34, 36 and 37 to capacitors 38, 39, 41 and 42, respectively. The low voltage side of each of the capacitors 38, 39, 41 and 42 is grounded. The output from the filter 25 is represented by the graph 50 (Figs. 1 and 4) where the envelope of the four groups of filtered or integrated pulses are indicated at U, R, D, L. The resistor 32 is provided to make the time constant of the capacitor circuits long enough to smooth out and substantially eliminate the effect of any high frequency noise pulses that may be received.

The switches 33, 34, 36 and 37 are driven in synchronism with the antenna switches by the motor 22. Thus, in the diagram the "up" antenna switch 17 is closed, the corresponding "up" switch 33 of the control circuit is also closed, and all other switches are open. Next, as the cams are rotated, the switches 18 and 36 close, switches 17 and 33 open, and the other switches remain open. The switching sequence in this particular example is U, R, D, L as will be apparent from the shape of the cams and from the direction of rotation indicated by the arrows. The complete switching cycle may occupy 1/60 second, for example.

During the time that switch 33 is closed, the capacitor 38 is charged to a voltage equal to the peak voltage of the U group of reflected pulses; after switch 33 opens, capacitor 38 retains this charge. Similarly, the other capacitors 39, 41 and 42 are charged by the received pulses so that the voltages thereacross correspond to the peak amplitudes of the pulses in groups D, R and L, respectively. The switches 33, 34, 36 and 37 preferably are timed to close shortly after the beginning of intervals U, R, D and L of graph 50, respectively, and to open shortly before the end thereof. It may be noted that the time scales for graphs 50 and 27 differ greatly, the pulse 27 actually being very short compared with the interval U, for instance.

The capacitors 38 and 39 have their high voltage sides connected through a cam operated switch 46 and through a low resistance resistor 47, respectively, to the terminals of the primary winding 48 of a transformer 49. The use of resistor 47 is desirable to determine the discharge time constant and to reduce sparking at the switch 46. Each time the switch 46 closes, the capacitors 38 and 39 discharge in opposition through the primary 48. The discharge circuit for capacitors 38 and 39 has a comparatively low impedance whereby the said two capacitors are brought to the same potential during the time the switch 46 is closed. The periodic flow of discharge current through the primary 48 induces voltage pulses 60 (Fig. 4) in the secondary 51 of the transformer 49, these voltage pulses having a polarity that is determined by the direction of the capacitor discharge.

The switch 46 is operated synchronously with the other cam operated switches and is adjusted to close either during the occurrence of the "right" pulses or during the occurrence of the "left" pulses. In the example shown, switch 46 closes at the same time that switch 37 closes, i. e., during the occurrence of the "left" pulses. It will be seen that voltage pulses 60 occurring at the rate of 60 per second are induced in the secondary 51 in the particular example illustrated. This rate, of course, is determined by the repetition rate of the switching cycle and, preferably, is equal to the frequency or to a subharmonic frequency of the available power line supply.

The induced voltage from secondary 51 is applied to an alternating current amplifier 52 which functions as a power amplifier to supply current to the armature 53 of an A.-C. motor 54 for operating either directly or indirectly the elevation control of the antenna and of any other units such as guns (not shown). The motor 54 has a field winding 56 which is connected to the same power line that supplies power to the motor 22. Thus the motor field current is either in phase or 180 degrees out of phase with the current supplied to the armature 53 and the motor 54 is driven in one direction or the other depending upon which phase relation exists.

The amplifier 52 preferably is of the push-pull type tuned to the frequency of the applied voltage. Such an amplifier is illustrated in Fig. 3. In the circuit illustrated the secondary 57 (Fig. 1) and the secondaries of the amplifier transformers 57 and 58 (Fig. 3) are tuned to 60 cycles per second. Suitable bias batteries 59 and 61 may be provided, as shown, connected between the transformer secondary midpoints and ground.

From the foregoing it will be apparent that if the antenna is pointing directly at the target in elevation, the capacitors 38 and 39 will be charged to like voltages, there will be no discharge current when the switch 46 closes, and the motor 54 will not be driven in either direction. However, if the antenna is "off" the target in elevation, the capacitors 38 and 39 will be charged to unlike voltages as shown, for example by curves 65 and 70, respectively. During the occurrence of the "left" pulses the discharge of capacitors 38 and 39 brings their voltages to the same value at the end of the "left" period as shown by curves 65 and 70, this discharge producing the voltage pulse 60. The periodically recurring pulses 60 drive the motor 54 in the proper direction to bring the antenna "on" the target. It will also be apparent that in my system there is no amplifier or balanced modulator having a bias that varies with fading of the received signals. As a result, one source of error in directing the antenna at a target has been eliminated.

The operation of the train control circuit is similar to that of the elevation control circuit. The capacitors 41 and 42 discharge in opposition through the low impedance primary circuit of a transformer 66 each time a cam operated switch 67 closes. The switch 67 is adjusted to close during either the occurrence of the "up" pulses or the "down" pulses. In the illustration it is adjusted to close during the occurrence of the "down" pulses. A low resistance resistor 68 may be included in the primary circuit. Each of the transformers 49 and 66 preferably has an electrostatic shield between primary and secondary as indicated by the dotted lines. The tuned secondary of transformer 66 supplies the induced voltage pulses to an A.-C. amplifier 69 which drives a train control motor 71 that is mechanically coupled to the antenna assembly as indicated by the legends and broken lines. The amplifier 69 and the motor 71 may be the same as the amplifier 52 and the motor 54, respectively.

It may be noted that while the use of a peak rectifier such as rectifier 26 is preferred, it is possible to employ other rectifiers such as one having an output that is a measure of the area or power of a pulse. It should be understood that the invention is not limited to a system employing four radiation patterns as it is equally applicable, for example, to a system having only left-right control or indication. Also, the radiation patterns may be produced by sound or light radiation, for example, rather than by radiation of radio signals, my capacitor-switching receiving system being equally applicable to all such systems.

From the foregoing description it will be seen that I have provided an improved pulse-echo servo system for directing automatically a directive antenna system or the like at a target or other reflecting object. Since the difficulty due to amplifier unbalance resulting from signal fading has been avoided, the antenna system will not be directed slightly "off" the target as a result of such fading.

I claim as my invention:

1. In a system for effecting a control or indication in accordance with the amplitudes of successively recurring voltage pulses, a pair of capacitors, means for charging said capacitors in accordance with the amplitudes of said successively recurring pulses, respectively, means for discharging said capacitors periodically in opposition through a comparatively low impedance circuit to obtain a periodic control voltage, a reversible alternating current motor, and means for driving said motor in accordance with said control voltage.

2. A receiver for a radio pulse-echo system which includes directive antennas having overlapping radiation patterns, each radiation pattern including a group of pulses which groups of pulses have been radiated in succession, means for demodulating the received pulses, a pair of vacuum tubes connected in push-pull relation, a pair of capacitors, means for connecting said demodulating means successively to said capacitors and in synchronism with the radiation of said patterns, respectively, to charge each of said capacitors to a voltage which is a measure of the amplitude of the group of said received pulses applied thereto, means for discharging said capacitors periodically in opposition through a low impedance circuit to obtain a periodic control voltage, means for applying said control voltage to said pair of vacuum tubes, and means for utilizing the output of said vacuum tubes for control or indication purposes.

3. In a system for effecting a control or indication in accordance with the amplitudes of successively recurring voltage pulses, a pair of capacitors, means for charging said capacitors in accordance with the amplitudes of said successively recurring pulses, respectively, means for discharging said capacitors periodically in opposition through a comparatively low impedance circuit to obtain a periodic control voltage, an alternating current amplifier having an input circuit and an output circuit, a reversible alternating current motor connected to said output circuit, and means for applying said control voltage to said amplifier input circuit.

4. In a system wherein a plurality of groups of pulses are received successively, a pair of vacuum tubes connected in push-pull relation to form an alternating current amplifier, a pair of capacitors, a pair of switching means associated with said pair of capacitors, respectively, means for passing direct current pulses representative of said groups of pulses through said switching means sequentially for charging said capacitors sequentially, means for making said switching means effective to pass current to said capacitors synchronously with the reception of said groups of pulses, means for discharging said pair of capacitors periodically in opposition to each other through a low impedance circuit to produce a periodic control voltage that is proportional to the discharge therethrough, and alternating current coupling means for applying said control voltage to said amplifier in push-pull relation.

5. A pulse-echo system comprising a transmitter and a receiver for the transmission and reception of groups of radio pulses, a plurality of directive antennas having overlapping radiation patterns in the horizontal plane and having overlapping radiation patterns in the vertical plane, each pattern including a group of said pulses, means for switching said antennas successively to said system, means for obtaining two voltage pulses which are a measure of the amplitude of the two groups of reflected pulses, respectively, in the horizontal plane, two capacitors for storing said two voltage pulses, respectively, means for obtaining two voltage pulses which are a measure of the amplitude of the two groups of reflected pulses, respectively, in the vertical plane, two capacitors for storing said last two voltage pulses, respectively, switching means operated in synchronism with said antenna switching for applying said two first-mentioned voltage pulses to the first two capacitors, respectively, and for applying said two last-mentioned voltage pulses to the last two capacitors, respectively, means for discharging the first two capacitors in series opposition through a low impedance circuit during reception of pulses in the vertical plane to produce a periodic control voltage, and means for discharging the last two capacitors in series opposition through a second low impedance circuit during reception of pulses in the horizontal plane to produce a second periodic control voltage.

6. A pulse-echo system comprising a transmitter and a receiver for the transmission and reception of groups of radio pulses, a plurality of directive antennas having overlapping radiation patterns in the horizontal plane and having overlapping radiation patterns in the vertical plane, each pattern including a group of said pulses, means for switching said antennas successively to said system, means for obtaining two voltage pulses which are a measure of the amplitude of the two groups of reflected pulses, respectively, in the horizontal plane, two capacitors for storing said two voltage pulses, respectively, means for obtaining two voltage pulses which are a measure of the amplitude of the two groups of reflected pulses, respectively, in the vertical plane, two capacitors for storing said last two voltage pulses, respectively, switching means operated in synchronism with said antenna switching for applying said two first-mentioned voltage pulses to the first two capacitors, respectively, and for applying said two last-mentioned voltage pulses to the last two capacitors, respectively, means for discharging the first two capacitors in series opposition through a low impedance circuit during reception of pulses in the vertical plane to produce a periodic control voltage, and means for discharging the last two capacitors in series opposition through a second low impedance circuit during reception of pulses in the horizontal plane to produce a second periodic control voltage, a pair of amplifiers having input and output circuits, means for applying said control voltages to said input circuits, respectively, through alternating current coupling circuits, and utilization devices connected to said output circuits.

WILLIAM A. TOLSON.

REFERENCES CITED

The following references are of record in the file of this patent:

UNITED STATES PATENTS

| Number | Name | Date |
|---|---|---|
| 2,197,734 | Steinhoff | Apr. 16, 1940 |